United States Patent [19]

Gilberg et al.

[11] Patent Number: 5,053,992

[45] Date of Patent: Oct. 1, 1991

[54] PREVENTION OF INSPECTION OF SECRET DATA STORED IN ENCAPSULATED INTEGRATED CIRCUIT CHIP

[75] Inventors: Robert C. Gilberg; Chinh Hoang, both of San Diego; James E. Smith, Escondido, all of Calif.

[73] Assignee: General Instrument Corporation, New York, N.Y.

[21] Appl. No.: 592,650

[22] Filed: Oct. 4, 1990

[51] Int. Cl.⁵ ............................................ B11C 11/407
[52] U.S. Cl. ........................................ 365/53; 365/96; 365/104; 365/114; 365/185; 357/23.5; 357/30; 357/72; 357/84
[58] Field of Search ................... 365/53, 96, 104, 114, 365/185; 357/23.5, 30, 72, 84

[56] References Cited

U.S. PATENT DOCUMENTS

| | | | |
|---|---|---|---|
| 4,665,503 | 5/1987 | Glasser | 365/114 |
| 4,758,984 | 7/1988 | Yoshida | 365/53 |
| 4,933,898 | 6/1990 | Gilberg et al. | 365/53 |

OTHER PUBLICATIONS

SCS-Thomson, STI6XYZ "Generic Modular Device, CMOS Safeguarded Microcontroller with EEPROM".

*Primary Examiner*—Joseph E. Clawson, Jr.
*Attorney, Agent, or Firm*—Edward W. Callan

[57] ABSTRACT

An integrated circuit chip includes a secure memory element that stores secret data, an opaque layer of material encapsulating the chip, and means for eliminating the secret data from the secure memory element in the event that the encapsulation material is removed from the chip. The eliminating means comprise a protective circuit encapsulated by the encapsulation material and coupled to the secure memory element. The protective circuit incldues a light sensitive element having a current characteristic that has a detectable change upon exposure to light; means for detecting said current change when the light sensitive element is exposed to light; and switching means coupled to the secure memory element and the detecting means for causing the secret data to be removed from the secure memory element in response to said current change produced by the light sensitive element when the light sensitive element is exposed to light, such that should the encapsulation material be removed from the chip, the secret data is eliminated from the memory element.

9 Claims, 3 Drawing Sheets

PREVENTION OF INSPECTION OF SECRET DATA STORED IN ENCAPSULATED INTEGRATED CIRCUIT CHIP

BACKGROUND OF THE INVENTION

The present invention generally pertains to integrated circuit chips for electronic data processing systems and is particularly directed to preventing inspection of secret data that is stored in a secure memory element of the integrated circuit chip.

Integrated circuit chips that process and store secret data include secure memory elements that store the secret data. Typically the chips are encapsulated in a layer of opaque material that prevents inspection of the stored secret data by visual inspection techniques, such as scanning electron microscopy and mechanical probing. However, although removal of the encapsulation layer is difficult to accmoplish and typically requires the use of hazardous chemical, such as highly reactive solvents and acids, it is possible to remove the encapsulation layer without also damaging the remainder of the chip, and without disrupting any essential power connections to the secure memory elements, and thereby expose the secure memory elements of an integrated circuit chip to visual inspection.

SUMMARY OF THE INVENTION

The integrated circuit chip of the present invention includes a secure memory element that stores secret data, an opaque layer of material encapsulating the chip, and means for eliminating the secret data from the secure memory element in the event that the encapsulation material is removed from the chip, wherein the eliminating means comprise a protective circuit encapsulated by the encapsulation material and coupled to the secure memory element. The protective circuit includes a light sensitive element having a current characteristic that has a detectable change upon exposure to light; means for detecting said current change when the light sensitive element is exposed to light; and switching means coupled to the secure memory element and the detecting means for causing the secret data to be removed from the secure memory element in response to said current change produced by the light sensitive element when the light sensitive element is exposed to light, such that should the encapsulation material to be removed from the chip, the secret data is eliminated from the memory element.

In a preferred embodiment, the protective circuit includes an unbalanced differential circuit having opposing arms, with the light sensitive element being disposed in one arm of the differential circuit and a second element being disposed in the other arm of the differential circuit, wherein the second element has a current characteristic in the absence of light that is substantially the same as the current characteristic in the absence of light of the first mentioned light sensitive element; wherein the chip includes a second layer of opaque material covering a portion of the differential circuit that includes the second element but not the first mentioned light sensitive element; and wherein the differential circuit is unbalanced to provide an output signal having a first state when neither light sensitive element is exposed to light and a second output state that is indicative of removal of the encapsulation material in response to said current change produced by the first mentioned light sensitive element when the first mentioned light sensitive element, but not the second element, is exposed to light. To conserve power while the chip is encapsulated, the protective circuit may further include light sensitive biasing means coupled to the differential circuit for enabling operation of the differential circuit only in response to detection of light by the light sensitive biasing means.

Devices such as transitors and diodes all exhibit conduction characteristics that are sensitive to electromagnetic radiation including the visible light spectrum. One of the most pronounced of these effects is the change in reverse current that results from the application of light. The several embodiments described herein utilize this reverse current characteristic to detect exposure to light of an integrated circuit chip that has been unencapsulated.

Preferably, the secure memory element is a volatile memory element, and the chip includes contact means coupled to the volatile memory element for coupling the volatile memory element to a power source; and the switching means couple the volatile memory element to the contact means, and respond to the current produced by the light sensitive element when the light sensitive element is exposed to light by decoupling the volatile memory element from the contact means to thereby remove power from the volatile memory element, such that should the encapsulation material be removed from the chip, power is removed from the volaltile memory element to thereby eliminate the secret data stored therein.

Additional features of the present invention are described in relation to the description of the preferred embodiment.

DESCRIPTION OF THE PREFERRED EMBODIMENTS

Figure 1:
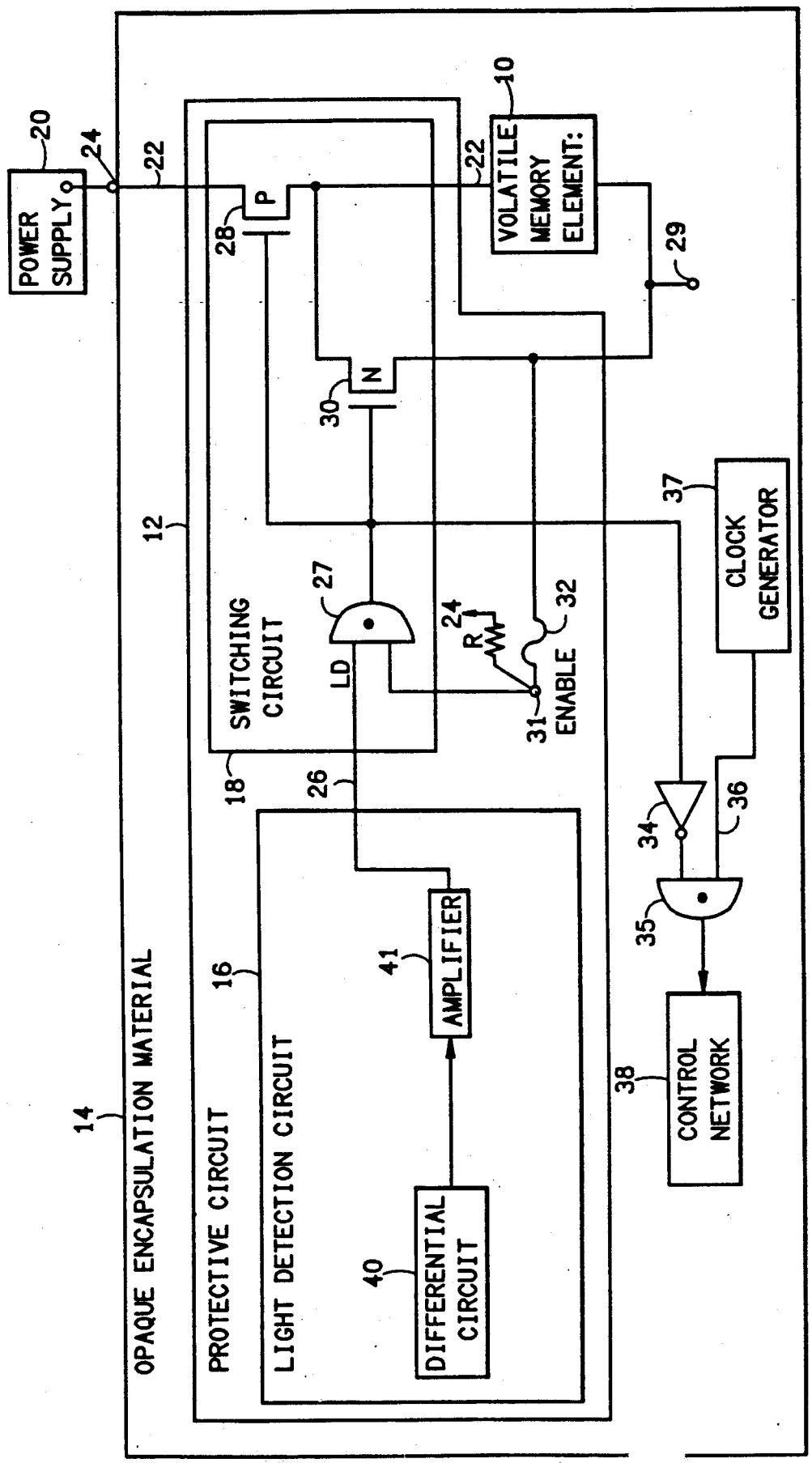
FIG. 1 is a block diagram of a preferred embodiment of the pertinent portion of an integrated circuit chip according to the present invention.

Referring to FIG. 1, a preferred embodiment of the integrated circuit chip of the present invention includes a secure memory element 10 that stores secret data, a protective circuit 12 and an opaque layer of material 14 that encapsulates the chip. The secure memory element 10 is a volatile memory element that must be coupled to a power source to retain data stored therein. If power to a volatile memory element is interrupted, any data stored therein is eliminated from the volatile memory element. Examples of volatile memory elements include, but are not restricted to, a random access memory (RAM), and a field programmable logic arrays wherein the internal logic operations are to be protected from visual inspection attacks for such purposes as reverse engineering.

The protective circuit 12 includes a light detection circuit 16 and a switching circuit 18. The switching circuit 18 couples the volatile secure memory element to a power source 20 by means of conductive elements 22 and a in contact 24 that is exposed on the exterior of the chip. The power source 20 is off the chip, as shown in FIG. 1. In an alternative embodiment (not shown) the power source is on chip. The power souce 20 for the secure memory element 10 is a battery.

When the the opaque encapsulation material 14 is removed from the chip, a light sensitive device in the light detection circuit 16 is exposed to light; and such exposure causes a light detection signal LD having a HIGH state to be provided on line 26 to the switching circuit 18.

The switching circuit 18 includes an AND gate 27, a PMOS FET 28 and an NMOS FET 30. The line 26 is coupled via the AND gate 27 to the gate of the PMOS FET 28 and the gate of the NMOS FET 30. The PMOS FET 28 is connected between the volatile secure memory element 10 and the power source 20. The volatile secure memory element 10 is permanently coupled to the substrate of the chip at a pin 29. The NMOS FET 30 is connected between the drain of PMOS FET 28 and the chip substrate pin 29.

During a LOW signal state on line 26, the PMOS FET 28 is on and the NMOS FET 30 is off so that the volatile secure memory element 10 is coupled to the power source 20 by the PMOS FET 28. When light is detected by the light sensitive element 42 in the protective circuit 12, a HIGH state light detection signal LD is provided on line 26 to turn off the PMOS FET 28 and turn on the NMOS FET 30 and thereby disconnect the volatile secure memory element 10 from the power source 20. When the power source 20 is removed from the volatile secure memory element 10, the contents of the volatile secure memory element 10 discharge to ground within a few seconds and thus erase or eliminate the secret data from the memory 10. The secret data must be erased quickly enough that it cannot be learned by visual inspection prior to completion of such erasure.

The HIGH state LD signal on line 26 is gated with an ENABLE signal at terminal 31 by the AND gate 27 so that under certain conditions the light detection circuit 16 may be essentially disabled. The terminal 31 is coupled to the power source 20 by a resistance R and the pin contact 24. This allows various kinds of arming devices to be used so that exposure of the light sensitive device of the light detection circuit 16 to light cannot impede certain manufacturing operations such as silicon wafer testing, for example. Fuses of various kinds which are included in secure integrated circuits for other security related purposes, as described in U.S. Pat. No. 4,933,898 to Robert C. Gilberg, Paul Moroney, William Allen Shumate and Richard M. Knowles, may be used as such an arming device.

In the chip of FIG. 1, the terminal 31 is coupled to the substrate pin 29 by a fuse 32, and thereby coupled to circuit ground so as to prevent the switching circuit 18 from removing data from the memory element 10 until all manufacturing and testing operations are completed and the final secret data is stored in the memory element 10. As a final step, the fuse 32 is irreversibly altered to disconnect the ENABLE terminal 31 from the substrate pin 29 so that the switching circuit 18 is then enabled by the power source 20. Alternately to the switching circuit 18 thereafter being continuously enabled by the power source 20, the switching circuit 18 can be enabled by an ENABLE signal being provided to the terminal 31 whenever desired.

Upon being so enabled, the switching circuit 18 responds to the light detection signal LD produced on line 26 by the light detection circuit 16 when the light detection circuit is exposed to light by decoupling the volatile secure memory element 10 from the pin contact 24 and thus from the power source 20, to thereby remove power from the volatile secure memory element 10. Accordingly, should the layer of encapsulation material 14 to be removed from the chip, power is removed from the volatile secure memory element 10 to thereby cause the secret data to be removed from the volatile secure memory element, and thus unavailable for visual application.

In alternative embodiments (not shown), a switching circuit responds to the light detection signal LD on line 26 by eliminating secret data from the secure memory element 10 by techniques other than by disconnecting the power source from the memory element. Such other techniques include erasing the the secret data from the secure memory element by writing null or bad (nonsense) data into the secure memory element.

In embodimdents used for preventing inspection of data in a nonvolatile memory, such as an EEPROM, the light detection signal provided by the light detection circuit triggers the provision of an erase signal that causes the contents of the EEPROM to be erased.

The light detection signal LD on line 26 also can be used to disable other on-chip functions, to thereby further disrupt attempts to pirate proprietary information from the chip. For example, the light detection signal LD is provided via the AND gate 27 and an inverter 34 to one input of an AND gate 35 to inhibit clock signals provided to another input of the AND gate 35 from being provided from a clock generator 37 to a control network 38 on the chip.

The light detection circuit 16 includes an unbalanced differential circuit 40 and an amplifier 41.

Figure 2:
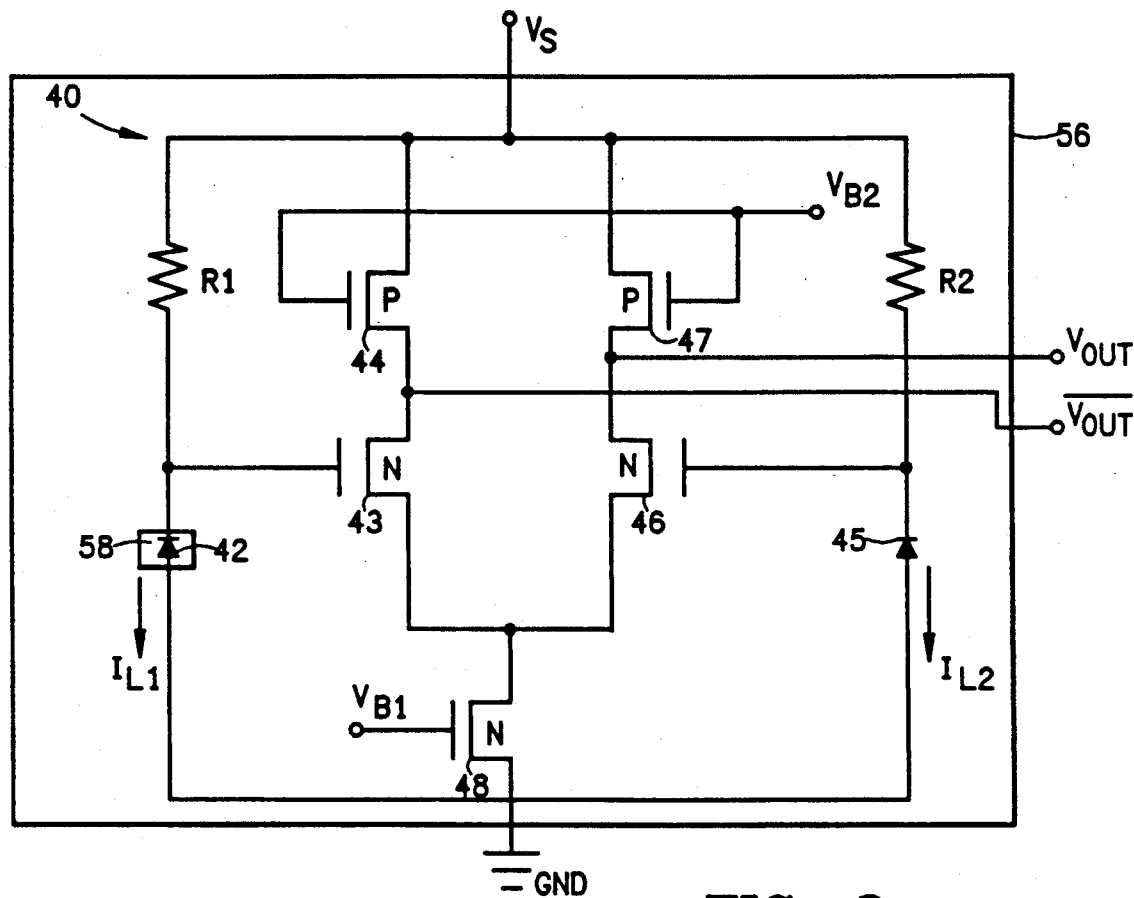
FIG. 2 is a schematic circuit diagram of a preferred embodiment of the differential circuit of the integrated circuit chip of FIG. 1.

Referring to FIG. 2, the differential circuit 40 includes a first light sensitive diode 42, a first FET 43 and a second FET 44 connected in series with the first FET 43 in one arm of the differential circuit and a second diode 45, a third FET 46 and a fourth FET 47 connected in a series with the third FET 46 in an opposing arm of the differential circuit.

The first light sensitive diode 42 has a characteristic of a detectable reverse current change in response to exposure to light. The second diode 45 has a current characteristic that is substantially the same in the absence of light as that of the first light sensitive diode 42.

The first FET 43 and the third FET 46 are coupled to circuit ground GND by a fifth transistor 48, which has its gate connected to a first bias voltage source $V_{B1}$. The second FET 44 and the fourth FET 47 are connected to a power source $V_S$. The gates of the second FET 44 and the fourth FET 47 are connected to a second bias voltage source $V_{B2}$. The gates of the first FET 43 and the third FET 46 are respectively connected to the first diode 42 and the second diode 45.

A $V_{OUT}$ terminal is connected to the junction of the first FET 43 and the second FET 44; and a $\overline{V_{OUT}}$ terminal is connected to the junction of the third FET 46 and the fourth FET 47.

A second layer of highly opaque m 'erial 56 covers all of the differential circuit 40 excep  : that portion 58 which includes the first light sensitive diode 42. The layer of highly opaque material 56 preferably is highly reflective metal, and is of such composition that it cannot be removed from the chip by the same process as may be used to remove the encapsulation layer 14 without also damaging the remainder of the chip.

The characteristics of the first, second, third and fourth FETs 43, 44, 46, 47 are such that while the layer of encapsulation material 14 covers the chip so that neither the first diode 42 nor the second diode 45 are exposed to light, the reverse current $I_{L2}$ through the second diode 45 is greater than the reverse current $I_{L1}$ through the first diode 42, whereby the voltage at the output terminal $V_{OUT}$ terminal is HIGH and the voltage at the $\overline{V_{OUT}}$ terminal is LOW.

When the encapsulation material layer 14 is removed without also removing the highly reflective layer 56, the diode 42 that is not covered by the highly reflective layer 56 senses the presence of light impinging upon the exposed portion 58 of the chip and the reverse current $I_{L1}$ through the first diode 42 changes by a sufficiently large amount to exceed the reverse current $I_{L2}$ through the second diode 45. The reverse current $I_{L2}$ through the second diode 45 does not change when the encapsulation material layer is removed, since the second diode 45 remains covered by the highly reflective layer 56. The values characteristics of the first, second, third and fourth FETs 43, 44, 46, 47 are such that when the reverse current $I_{L1}$ through the first diode 42 exceeds the reverse current $I_{L2}$ through the second diode 45, the voltage at the output terminal $V_{OUT}$ terminal becomes LOW and the voltage at the $\overline{V_{OUT}}$ terminal becomes HIGH.

The characteristic of the first, second, third and fourth FETs 43, 44, 46, 47 are also such that operation of the differential circuit 40 is not affected by such factors as chip noise, device process mismatching, and thermal excitation, so to avoid a false detection of light in the absence of the encapsulation material layer 14 being removed.

The voltage at the output terminal $V_{OUT}$ terminal and the voltage at the $\overline{V_{OUT}}$ output terminal may be used directly to provide the HIGH state light detection signal LD on line 26 of, if necessary, further amplified by the amplifier 41.

Referring again to the differential circuit 40 shown in FIG. 2, bipolar junction transistors can be substituted for the first, second, third fourth and fifth FETs, 43, 44, 46, 47 and 48. Device selection is a matter of choice dictated primarily by the particular integrated circuit technology being utilized. The present invention may be adapted to a wide range of technologies.

Also, open-base bipolar PNP transistors can be substituted for the first and second diodes 42, 45 to provide light sensitive elements in the differential circuit 40 shown in FIG. 2. Open-base bipolar PNP transistors are available in many CMOS processes with the advantage of current gain by transistor action over a simple diode reverse current approach. A further extension of this concept could include Darlington configured transistors.

Figure 3:
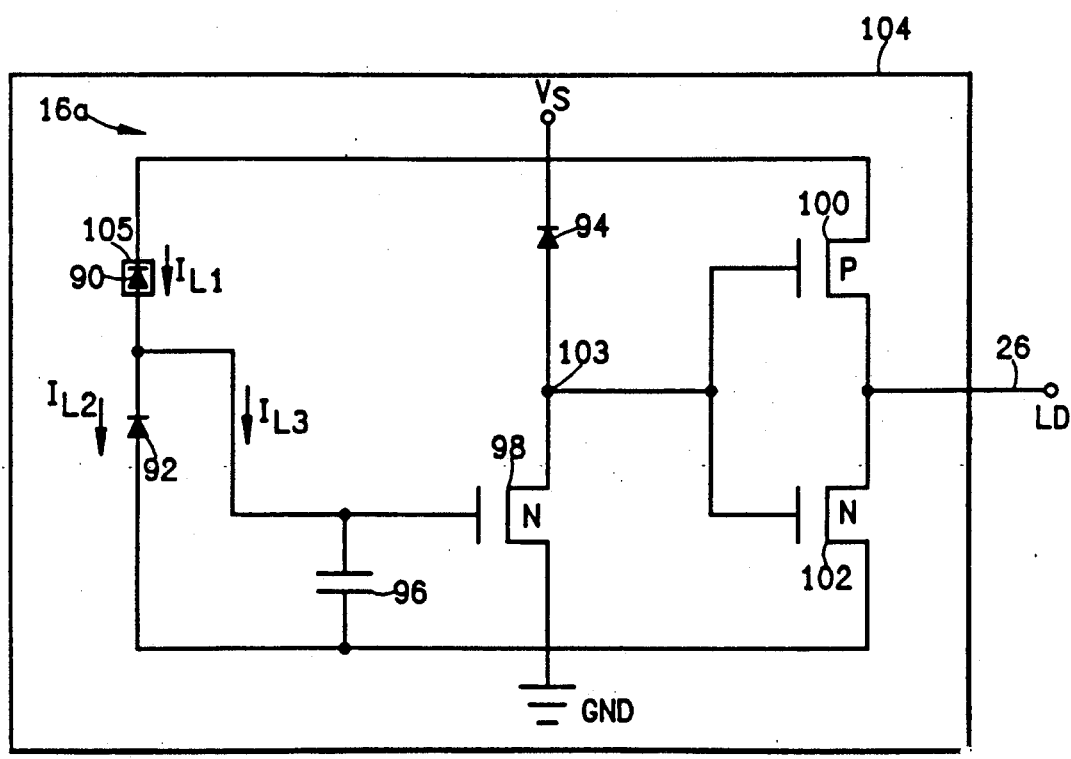
FIG. 3 is a schematic circuit diagram of an alternative preferred embodiment of the light detection circuit of the integrated circuit chip of FIG. 1.

FIG. 3 illustrates an alternative embodiments of a light detection circuit 16a that may be used under circumstances that require very low standby current drain from the power source $V_S$. The embodiment of FIG. 2 requires a continuous supply of current into the differential amplifiers from the power source $V_S$.

The light detection circuit 16a of FIG. 3 includes a first light sensitive diode 90, a second diode 92, a third diode 94, a capacitance 96, a first NMOS FET 98, a second PMOS FET 100 and an NMOS FET 102. The first and second diodes 90, 92 are connected in series between a power source $V_S$ and substrate ground GND. The gate of the first FET 98 is connected to the junction of the first and second diodes. The first FET 98 is connected in series within the third diode 94 between the power source $V_S$ and substrate ground GND. The capacitance 96 is connected between the gate of the first FET 98 and the substrate ground GND. The second PMOS FET 100 and the NMOS FET 102 are connected in series between the power source $V_S$ and substrate ground GND. The gates of both and the second PMOS FET 100 and the NMOS FET 102 are connected to the junction 103 of the first NMOS FET 98 and the third diode 94. Line 26, on which the light detection signal LD is provided, is connected to the junction between the second PMOS FET 100 and the NMOS FET 102.

A second layer of highly opaque material 104 covers all of the light detection circuit 16a except for that portions 105 which includes the first light sensitive diode 90. The layer of highly opaque material 104 preferably is highly reflective metal, and is of such composition that it cannot be removed from the chip by the same process as may be used to remove the encapsulation layer 14 without also damaging the remainder of the chip.

Operation of the light detection circuit 16a is based upon the light induced reverse current $I_{L1}$ of the first diode 90 becoming of greater magnitude than the reverse current $I_{L2}$ of the second diode 92 to thereby provide a charging current $I_{L3}$ to the gate of the first NMOS FET 98, which will turn on the first NMOS FET 98 as the voltage across the capacitance 96 becomes greater than the threshold voltage required to turn on the first NMOS FET 98.

The respective characteristics of the first and second light sensitive diodes 90, 92 are such that in the absence of light the reverse current $I_{L1}$ of the first diode 90 is less than the reverse current $I_{L2}$ of the second diode 92, and such that in the presence of light the reverse current $I_{L1}$ of the first diode 90 is greater than the light induced reverse current $I_{L2}$ of the second diode 92. Thus, in the absence of light the voltage across the capacitance 96 is not charged by the current $I_{L3}$ and remains less than the threshold voltage of the first NMOS FET 98. Accordingly the first NMOS FET 98 remains turned off and the voltage at the junction 103 is HIGH due to reverse current through the FET 94 so that the second PMOS FET 100 is turned off and the NMOS FET 102 is turned on to thereby provide a LOW state signal on line 26.

When the encapsulation material layer 14 is removed without also removing the highly reflective layer 104, the light induced reverse current $I_{L1}$ of the first diode 90 becomes greater than the reverse current $I_{L2}$ of the second diode 92 to thereby provide a charging current $I_{L3}$ to the gate of the first NMOS FET 98, which turns on the first NMOS FET 98. When the first NMOS FET 98 is turned on the voltage at the junction 103 becomes LOW so that the second PMOS FET 100 is turned on and the NMOS FET 102 is turned off to thereby provide a HIGH state light detection signal on line 26.

The characteristics of the first, second and third diodes 90, 92, 94 and of the first NMOS FET 98 are such that operation of the light detection circuit 16 is not affected by such factors as chip noise, device process mismatching, and thermal excitation, so to avoid a false detection of light in the absence of the encapsulation material layer 14 being removed.

Figure 4:
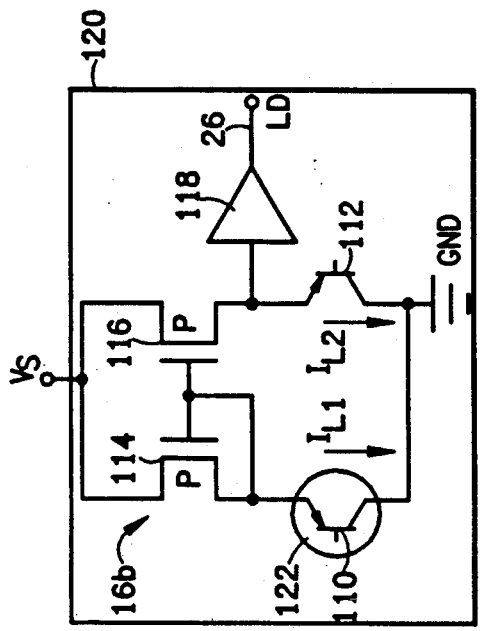
FIG. 4 is a schematic circuit diagram of another alternative preferred embodiment of the light detection circuit of the integrated circuit chip of FIG. 1.

Referring to FIG. 4, another preferred embodiment of the light detection circuit 16b includes a first open base bipolar PNP transistor 110 as a light sensitive device, a second open base bipolar PNP transistor 112, a first PMOS FET 114, a second PMOS FET 116 and an amplifier 118. The first transistor 110 and the first PMOS FET 114 are connected in series between a power source $V_S$ and substrate ground GND in one arm of an unbalanced differential circuit. The second transistor 112 and the second PMOS FET 116 are connected in series between the power source $V_S$ and substrate ground GND in an opposing arm of the unbalanced differential circuit. The respective gates of both FETs 114, 116 are connected to the emitter of the first transistor 110 at the junction of the first transistor 110 and the first PMOS FET 114. The input of the amplifier 118 is connected to the emitter of the second transistor 112 at the junction of the second transistor 112 and the second PMOS FET 116. Line 26, upon which the light detection signal LD is provided, is connected to the output of the amplifier 118.

A second layer of highly opaque material 120 covers all of the light detection circuit 16b except for a portion 122 which includes the first light sensitive transistor 110. The layer of highly opaque material 104 preferably is highly reflective metal, and is of such composition that it cannot be removed from the chip by the same process as may be used to remove the encapsulation layer 14 without also damaging the remainder of the chip.

The operation of the light detection circuit 16b of FIG. 4 is essentially digital and depends on the second PMOS FET 116 and the second transistor 112 adjusting their terminal voltages in an attempt to match their currents. In the dark both of the transistors 110, 112 operate with very small junction reverse currents. Exposure to light causes the light sensitive transistor 110 to operate with a current $I_{L1}$ that is several orders of magnitude larger than the regular junction reverse current $I_{L2}$ in the second transistor 112. These mismatched currents $I_{L1}$ and $I_{L2}$ are then converted into a differential voltage at the emitter of the second transistor 112 that is amplified by the amplifier 118 to provide the signal on line 26.

The respective characteristics of the first and second PMOS FETs 114, 116 are such that the reverse current $I_{L1}$ of the transistor 110 is divided by a factor of ten to provide a current $I_{L2}$ that flows through the second transistor 112.

In the absence of light the resultant current $I_{L2}$ through the transistor 112 is very small and voltage at the emitter of the second transistor 112 is pulled low, thereby providing a LOW state signal on line 26 at the output of the amplifier 118.

When the encapsulation material layer 14 is removed without also removing the highly reflective layer 120, the light induced reverse current $I_{L1}$ of the first transistor 110 increases sufficiently to pull the voltage at the emitter of the second transistor 112 HIGH and thereby provide a HIGH state light detection signal LD on line 26 at the output of the amplifier 118.

The characteristics of the first and second transistors 110, 112 and of the first and second PMOS FETs 114, 116 are such that operation of the light detection circuit 16b is not affected by such factors as chip noise, device process mismatching, and thermal excitation, so to avoid a false detection of light in the absence of the encapsulation material layer 14 being removed.

Figure 5:
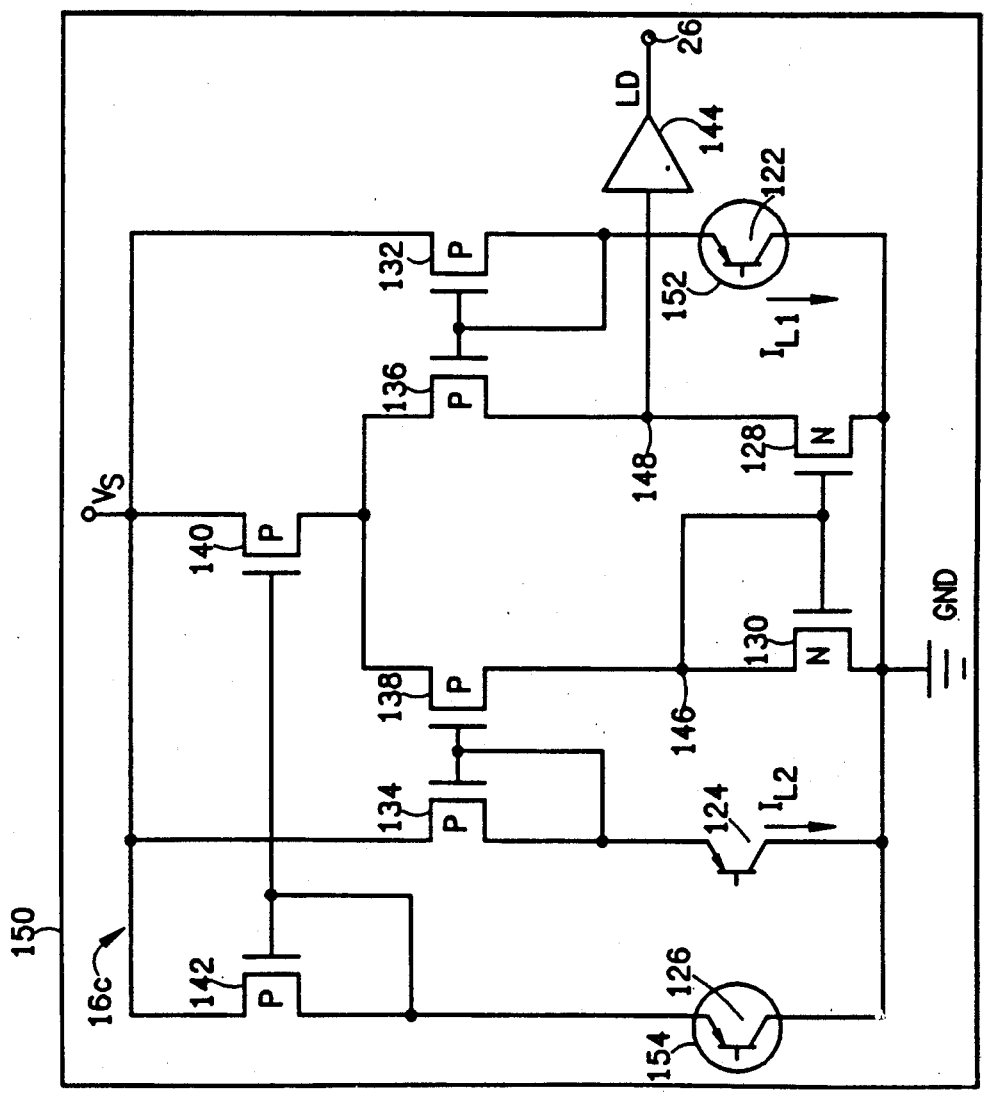
FIG. 5 is a schematic circuit diagram of still another alternative preferred embodiment of the light detection circuit of the integrated circuit chip of FIG. 1.

Referring to FIG. 5, still another preferred embodiment of the light detection circuit 16c includes a first open base bipolar PNP transistor 122 as a light sensitive device, a second open base bipolar PNP transistor 124, a third open base light sensitive bipolar PNP transistor 126, a first NMOS FET 128, a second NMOS FET 130, a first PMOS FET 132, a second PMOS FET 134, a third PMOS FET 136, a fourth PMOS FET 138, a fifth PMOS FET 140, a sixth PMOS FET 142 and an amplifier 144. The first transistor 122 and the first PMOS FET 132 are connected in series between a power source $V_S$ and substrate ground GND in one arm of an unbalanced differential circuit. The second transistor 124 and the second PMOS FET 134 are connected in series between the power source $V_S$ and substrate ground GND in an opposing arm of the unbalanced differential circuit. The first and second NMOS FETs 128, 130 and the third, fourth and fifth PMOS FETs 136, 138, 140 are interconnected to form an analog differential comparator. The first NMOS FET 128 and the third PMOS FET 136 are connected in series with the fifth PMOS FET 140 between the power source $V_S$ and substrate ground GND. The second NMOS FET 130 and the fourth PMOS FET 138 are connected in series with the fifth PMOS FET 140 between the power source $V_S$ and substrate ground GND. The third transistor 126 and the sixth PMOS FET 142 are connected in series between a power source $V_S$ to provide a biasing circuit. The respective gates of the first PMOS FET 132 and the third PMOS FET 136 both are connected to the emitter of the first transistor 122. The respective gates of the second PMOS FET 134 and the fourth PMOS FET 138 both are connected to the emitter of the second transistor 124. The respective gates of the fifth PMOS FET 140 and the sixth PMOS FET 142 both are connected to the emitter of the third transistor 126. The respective gates of the first NMOS FET 128 and the second NMOS FET 130 both are connected to the junction 146 between the second NMOS FET 130 and the fourth PMOS FET 138. In an alternative embodiment (not shown), the first NMOS FET 128 and the second NMOS FET are connected in a latch configuration with the gate of the first NMOS FET connected to the junction 146 and the gate of the second NMOS FET connected to a junction 148 between the first NMOS FET 128 and the third PMOS FET 136. In both embodiments, the input to the amplifier 144 is connected to the junction 148; and line 26, upon which the light detection signal LD is provided, is connected to the output of the amplifier 144.

A second layer of highly opaque material 150 covers all of the light detection circuit 16c except for those portions 152 and 154 which respectively include the first light sensitive transistor 122 and the third light sensitive transistor 126. The layer of highly opaque material 150 preferably is highly reflective metal, and is of such composition that is cannot be removed from the chip by the same process as may be used to remove the encapsulation layer 14 without also damaging the remainder of the chip.

The light detection circuit 16c of FIG. 5 is based upon the operation of the analog differential comparator 128, 130, 136, 138, 140. In the dark the comparator and its biasing circuit 126, 142 are dormant to avoid unnecessary drainage of the power source $V_S$, which preferably is a battery, The comparator and its biasing circuit 126, 142 come alive only in the presence of light.

When the encapsulation material layer 14 is removed without also removing the highly reflective layer 150, the light induced reverse current $I_{L1}$ of the first transistor 122 becomes much larger than the reverse current $I_{L2}$ of the second transistor 124, which is covered by the layer 150 and remains in the dark. The respective currents $I_{L1}$ and $I_{L2}$ through the first transistor 122 and the second transistor 124 are converted into a differential voltage between the respective emitters of the first transistor 122 and the second transistor 124. This differential voltage is compared by the comparator 128, 130, 136, 138, 140, which responds by providing a light detection signal at the junction 148 to the input of the amplifier 144. The amplifier 144 amplifies the signal at the junction 148 to provide a HIGH state light detection signal LD on line 26.

We claim:

1. An integrated circuit chip including a secure memory element that stores secret data, an opaque layer of material encapsulating the chip, and means for eliminating the secret data from the secure memory element in the event that the encapsulation material is removed from the chip, wherein the eliminating means comprise
   a protective circuit encapsulated by the encapsulation material and coupled to the secure memory element, with the protective circuit including
      a light sensitive element having a current characteristic that has a detectable change upon exposure to light; means for detecting said current change when the light sensitive element is exposed to light; and
      switching means coupled to the secure memory element and to the detecting means for causing the secret data to be removed from the secure memory element in response to said current change produced by the light sensitive element when the light sensitive element is exposed to light, such that should the encapsulation material be removed from the chip, the secret data is eliminated from the memory element.

2. An integrated circuit chip according to claim 1, wherein the protective circuit includes an unbalanced differential circuit having opposing arms, with the light sensitive element being disposed in one arm of the differential circuit and a second element being disposed in the other arm of the differential circuit, wherein the second element has a current characteristic in the absence of light that is substantially the same as the current characteristic in the absence of light of the first mentioned light sensitive element;
   wherein the chip includes a second layer of opaque material covering a portion of the differential circuit that includes the second element but not the first mentioned light sensitive element; and
   wherein the differential circuit is unbalanced to provide an output signal having a first state when neither light sensitive element is exposed to light and a second output state that is indicative of removal of the encapsulation material in response to said current change produced by the first mentioned light sensitive element when the first mentioned light sensitive element, but not the second element, is exposed to light.

3. An integrated circuit chip according to claim 2, wherein the protective circuit further includes light sensitive biasing means coupled to the differential circuit for enabling operation of the differential circuit only in response to detection of light by the light sensitive biasing means.

4. An integrated circuit chip according to claim 2, wherein the second opaque material is highly reflective.

5. An integrated circuit chip according to claim 1,
   wherein the secure memory element is a volatile memory element, and the chip includes contact means coupled to the volatile memory element for coupling the volatile memory element to a power source; and
   wherein the switching means couple the volatile memory element to the contact means, and respond to the current produced by the light sensitive element when the light sensitive element is exposed to light by decoupling the volatile memory element from the contact means to thereby remove power from the volatile memory element, such that should encapsulation material be removed from the chip, power is removed from the volatile memory element to thereby eliminate the secret data stored therein.

6. An integrated circuit chip according to claim 1, wherein the light sensitive element is a diode having a characteristic of a detectable reverse current change in response to exposure to light.

7. An integrated circuit chip according to claim 1, wherein the light sensitive element is a bipolar transistor having a characteristic of a detectable junction reverse current change in response to exposure to light.

8. An integrated circuit chip according to claim 1, further comprising an alterable means, such as a fuse, for preventing the switching means from responding to said current change until such time as said alterable means are altered.

9. An integrated circuit chip according claim 1, further comprising
   means for disabling other chip functions, such as control functions, in response to said current change.

* * * * *